(No Model.)
F. E. CASE.
METHOD OF APPLYING INSULATION.
No. 536,184. Patented Mar. 26, 1895.
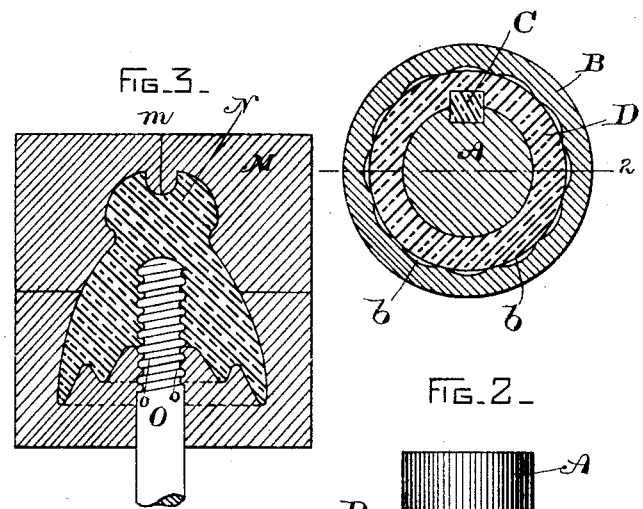
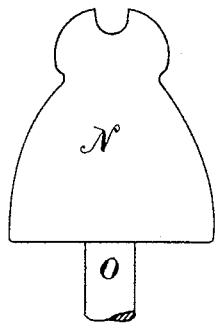
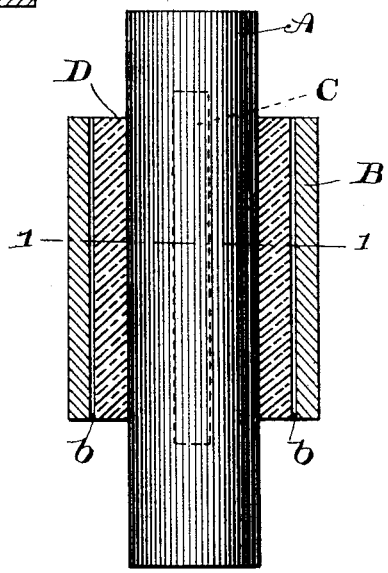
WITNESSES
A. F. Macdonald
J. J. Johnston
INVENTOR
Frank E. Case, by
Geo. R. Blodgett,
atty.

UNITED STATES PATENT OFFICE.

FRANK E. CASE, OF SCHENECTADY, NEW YORK, ASSIGNOR TO THE GENERAL ELECTRIC COMPANY, OF NEW YORK.

METHOD OF APPLYING INSULATION.

SPECIFICATION forming part of Letters Patent No. 536,184, dated March 26, 1895.

Application filed June 21, 1894. Serial No. 515,243. (No specimens.)

*To all whom it may concern:*

Be it known that I, FRANK E. CASE, a citizen of the United States, residing at Schenectady, county of Schenectady, State of New York, have invented certain new and useful Improvements in Methods of Applying Insulation, of which the following is a specification.

My invention relates to methods of applying insulation, particularly to metal parts with which I may wish to unite it, in such a manner as to make the union one of strength and rigidity; and has also reference to methods of uniting cast metal parts to shafts about which they revolve; for which purpose I insert between the two parts a material which swells when heated within certain limits so that after the parts are united by heating, subsequent cooling does not cause the interposed material to shrink, and the parts are thus held rigidly in position. In uniting a shaft or axis to a surrounding metal part or sleeve, I thus get a substantially concentric union of the parts, permitting the outer surface of the sleeve or other casting to be finished true in a lathe at a minimum of expense of time and waste of material. I may also employ this same process for applying insulation to the outer surface of an article or for causing the body of insulating material to adhere to a stud or other supporting part, in which case I preferably form the insulator under heat and pressure in a mold leaving an opening of approximately the size of the stud required, although this may be dispensed with and a hole may be tapped afterward. Into this hole I then insert the stud and inclose the insulator in a mold the parts of which are secured firmly together, and heat the mold and its contents, allowing the insulator to cool before the parts of the mold are removed.

An embodiment of my invention is illustrated in the accompanying drawings, wherein—

Figure 1 is a section upon the line 1—1 of Fig. 2, and Fig. 2 is a section upon the line 2—2 of Fig. 1, showing my improved method, while Fig 3 is a section showing an insulator in the mold, as already described, and Fig. 4 is an elevation of the insulator after its removal.

A is the central shaft. B is the exterior sleeve or shell which is to be united thereto. The inner surface of this sleeve or shell is shown in the small scallops or irregularities $b, b$, by which I mean only to illustrate the fact that it may be irregular in shape on its inner surface in any way.

C is a key providing a grip or hold for the interposed material, and D is the interposed uniting material.

The drawings are illustrative merely, and any other form may be adopted in the practice of my invention, which consists in the method rather than in the special means employed.

By preference I take the outer casting or sleeve as it comes from the mold before it is finished; and in the practice of my invention I then insert within it a ring of the composition known in the electric arts as "liebite," which is described in the patent to Joseph Hoffmann, No. 505,916, filed October 3, 1893. This composition is composed, as is pointed out in the patent named, of asbestos and other materials, and is molded under heat and great pressure into the forms desired, which forms, under ordinary circumstances, it retains perfectly. I have found however that when baked in an oven or otherwise subjected to a high degree of heat, it expands within certain limits with great force. Within the sleeve thus formed I insert the key and the shaft, the sleeve being adapted as nearly as possible to the size of the particular parts desired to be united; and I then, as indicated above, bake the parts in an oven or otherwise heat them in any convenient manner, whereby the interposed material expands with great force and fills all the irregularities in the surfaces of the two parts to be united, adhering to them with such tenacity as to give a more rigid and perfect joint than any with which I am acquainted.

Referring now to Figs. 3 and 4, I show the method of applying an insulator to a stud as illustrative of the means which I employ in such cases. Therein M is the mold divided upon the line m. N is the body of insulating material, which is already formed under heat and pressure as herein specified, and O is the central stud or pin to which it is desired to apply the insulator, the upper end of the stud being roughened or irregular in contour as shown at o, o, although this is not essential. In applying the method herein pointed out to this particular purpose, I find it convenient to lubricate the inner surface of the mold with powdered soapstone or graphite, or I may employ a greasy lubricant of any fixed nature, of any of which substances I apply only a just sufficient quantity to prevent the insulator sticking to the mold when the heat is applied. I do not illustrate means for holding the parts of the mold together, nor do I illustrate any heating apparatus, for these are well known in the art.

Fig. 4 shows the completed insulator in elevation, N being the insulator and O being the stud to which it is applied.

It is manifest that parts of any size or shape may be thus united if it is desired; but I have practiced my invention more particularly with the shafts and cylinders of the devices known in the art as controllers for electric motors, wherein it is especially desirable that the shaft and the switching cylinder always maintain the same relation, so that the same position of the operating handle will always give the same position of switch contacts; and for this purpose I have found my invention especially useful; although I do not mean to limit myself thereto. It is also manifest that other materials than the one known as liebite might be employed, it being only necessary that these materials should be such as will expand under heat after compression. I have found the material named, however, to be one which gives good results, and as it is at the same time substantially fire proof, and an excellent insulating material, it serves to isolate the handle of the controller, in the particular instance described, from the switching apparatus so as to prevent any danger of current being carried to the handle.

What I claim as new, and desire to secure by Letters Patent of the United States, is—

1. The method of applying insulation, which consists in applying when cold to the part to which it is to be united, an insulating compressed material adapted to expand under heat and retain its expanded form when cold, and then heating the insulation while the compressed material and the part to which it is to be united are held firmly together.

2. The method of applying insulation, which consists in forming the insulating material under heat and pressure in a mold, and applying it to the part to which it is to be united while cold, then heating the compressed insulating material while held firmly in place, the part to which it is to be united and the mold, and then allowing the whole to cool before removing the holder.

3. The method of applying insulation to metal parts, which consists in interposing between the parts a compressed material adapted to expand under heat and retain its expanded form when cold, and then heating the parts, as herein described.

4. The method of applying insulation to cast metal pieces, which consists in interposing between the parts a ring or suitably shaped part of liebite, and then heating the parts to unite them.

5. The method of applying insulation to a shaft and surrounding sleeve of metal, which consists in surrounding the shaft with a ring or sleeve of liebite interposed between the shaft and the sleeve with which it is to be united, and then heating the parts so as to expand the interposed ring or sleeve, substantially as described.

In witness whereof I have hereunto set my hand this 19th day of June, 1894.

FRANK E. CASE.

Witnesses:
B. B. HULL,
A. F. MACDONALD.